United States Patent [19]

Cooke

[11] Patent Number: 4,976,222
[45] Date of Patent: Dec. 11, 1990

[54] HORSE FEEDER

[76] Inventor: Jeffery V. Cooke, P.O. Box 2659, Paso Robles, Calif. 93447

[21] Appl. No.: 371,376

[22] Filed: Jun. 26, 1989

[51] Int. Cl.⁵ .............................................. A01K 1/10
[52] U.S. Cl. ........................................ 119/60; 119/61
[58] Field of Search ......................... 119/18, 60, 61, 63

[56] References Cited

U.S. PATENT DOCUMENTS

| | | | |
|---|---|---|---|
| 1,592,492 | 7/1926 | Kelly | 119/60 |
| 2,084,240 | 6/1937 | Buckle | 119/61 |
| 2,115,817 | 5/1938 | Lahiere | 119/61 |
| 2,122,880 | 7/1938 | Dost | 119/61 |
| 2,433,912 | 1/1948 | Keagle | 119/61 |
| 2,586,872 | 2/1952 | Simmons et al. | 119/61 |
| 3,362,382 | 1/1968 | Frasier | 119/60 |

FOREIGN PATENT DOCUMENTS 24207 of 1907 United Kingdom .................. 119/60

Primary Examiner—John Weiss
Assistant Examiner—R. Thomas Price
Attorney, Agent, or Firm—Daniel C. McKown

[57] ABSTRACT

A horse feeder that includes a receptacle surmounted by a grille. The grille includes an upstanding arch located near the back of the receptacle through which the hay is inserted into the feeder from the rear. The grille also includes bars that slope downwardly and frontwardly to confine the feed during the entire feeding period. These features permit the feeder to be mounted closer to the ground than is possible with conventional feeders, which enables the horse to feed in a more natural grazing position.

3 Claims, 2 Drawing Sheets

HORSE FEEDER

BACKGROUND OF THE INVENTION

1. Field of the Invention

The present invention is in the field of animal husbandry and more specifically relates to a feeder for dispensing hay to a horse or similar grazing animal.

2. The Prior Art

A typical horse feeder of the prior art includes a basin surmounted by a grille for holding the hay. In these prior art feeders, the hay is loaded into the feeder through the top of the feeder, and the horse is expected to pull the hay through the bars of the grille. The basin serves to catch some of the hay which would otherwise fall to the ground and be wasted.

In these prior art feeders, the grille almost invariably sloped downwardly and away from the horse, i.e., toward the rear of the feeder.

Prior art feeders of this type are shown in the following patents: U.S. Pat. No. 3,362,382 issued Jan. 9, 1968 to Frasier; U.S. Pat. No. 493,040 issued Mar. 7, 1893 to Morse; U.S. Pat. No. 287,771 issued Jan. 13, 1987 to Kimble; and, U.S. Pat. No. 232,848 issued Sept. 17, 1974 to Barton, et al. Because the grilles in these prior art feeders sloped downwardly away from the horse, it was necessary, or at least desirable, to mount the feeder five or six feet above the ground to provide easier access by the horse to the hay behind the grille, and also to prevent the horse from pulling the entire flake of hay through the open top of the grille. The entire flake falls to the ground, and when the horse feeds from the ground he runs the risk of sand colic, unsanitary conditions, and generally poor feed utilization resulting in waste.

Unfortunately, the inward slant of the grille, combined with the height of the feeder practically assured that the horse would be looking up at the grille, with the result that bits of hay would fall into the horse's eyes and ears, irritating him. Under these circumstances, the horse could be expected to become annoyed and to pull the flake from the feeder.

SUMMARY OF THE INVENTION

The present invention is based on the observation that for untold millennia horses have been grazers. They prefer to eat their food from the ground or within a foot or two of the ground. This recognition is the basis for the design of the present invention.

In keeping with this approach, the feeder of the present invention is mounted lower than prior art feeders, so that when the horse feeds from it, his head is lower than his heart.

Clearly, with the feeder mounted that low, a grille that slopes downwardly away from the horse would be very inconvenient for the horse, and so in accordance with the present invention, the front of the grille slopes downward toward the horse. This confines the flake during the feeding period, resulting in better feed utilization and less waste.

As mentioned above, in the prior art feeders, the top of feeder was open so that the hay could easily be dropped into it. That approach would not be practical with a feeder mounted as low as the feeder of the present invention is intended to be mounted. The present inventor solved this problem by extending the grille upward over the feeder and by providing a vertical opening accessible from the rear of the feeder for inserting the hay. Thus, in the present invention the hay is loaded into the feeder from the rear rather than from the top. The feeder of the present invention permits the horse to feed with his head at a more natural, lowered position which is beneficial for the horse's salivation and digestion.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

The structure of the horse feeder of the present invention is quite simple. It includes a receptacle 12 that is surmounted by a grille 30.

Figure 1:
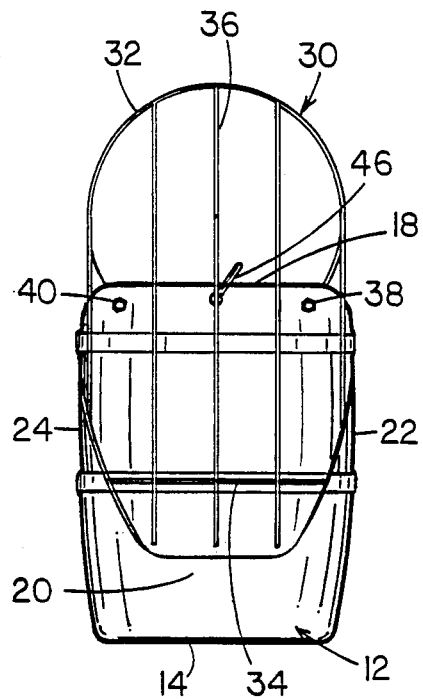
FIG. 1 is a front elevational view of a preferred embodiment of the horse feeder of the present invention.
Figure 2:
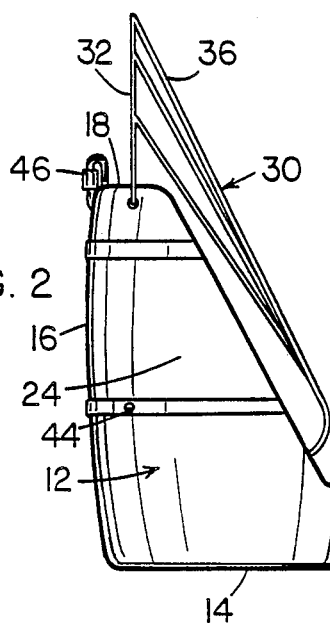
FIG. 2 is a side elevational view of the preferred embodiment.
Figure 3:
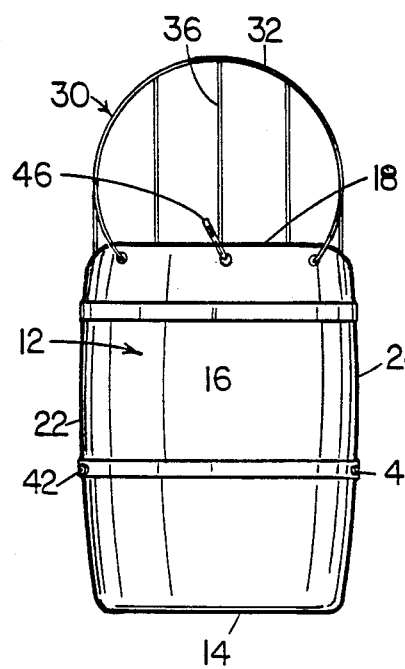
FIG. 3 is a rear elevational view of the preferred embodiment.

The receptacle 12 includes a bottom 14 and a back 16 that extends upwardly from the bottom to an upper edge 18. As best seen in FIG. 2, the sides 22, 24 of the receptacle 12 taper downwardly and forwardly from the upper edge 18 of the back to a lip 20 that extends across the front of the receptacle a short distance above the bottom 14.

In the preferred embodiment shown in the drawings, receptacle 12 is fashioned from a plastic barrel that has been cut to the desired shape. Such plastic barrels are a staple item of commerce.

The grille 30 includes an upstanding arch 32 that lies in an approximately vertical imaginary plane that intersects the receptacle 12 at or within several inches of the back 16.

The grille 30 further includes a lower grill support rod 34 that extends in a substantially horizontal plane that is spaced above the bottom 14 of the receptacle and intersects the lower portion of the receptacle.

The upstanding arch 32 and the lower grill support rod 34 are interconnected by a number of bars of which the bar 36 is typical. From the upstanding arch 32, the bars extend downwardly and forwardly, and in the preferred embodiment, the lower ends of the bars curve rearwardly, extending an appreciable distance toward the back 16 so as to serve as supports for the hay.

In the preferred embodiment, the bars 36 are welded to the upstanding arch 32 and the lower grille support rod 34, and the entire grille is composed of stainless steel.

In the preferred embodiment, the ends of the upstanding arch 32 are threaded and are secured to the back 16 near its upper edge 18 by the nuts 38, 40. Likewise, the ends of the lower grille support rod 34 are threaded and are secured to the receptacle by the nuts 42, 44. In the preferred embodiment, a nut and washer are used on opposite sides of the wall of the receptacle.

In the preferred embodiment, the receptacle 12 is provided with a carabiner 46 to facilitate mounting the feeder to a fence or to an eye installed on a wall.

Figure 5:
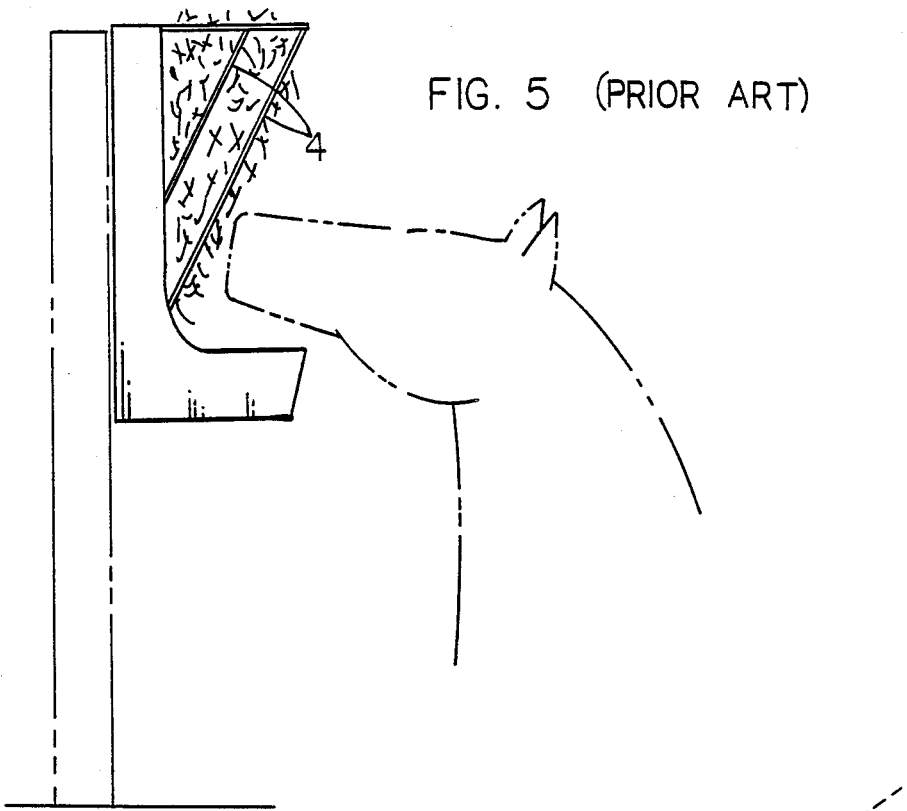
Figure 4:
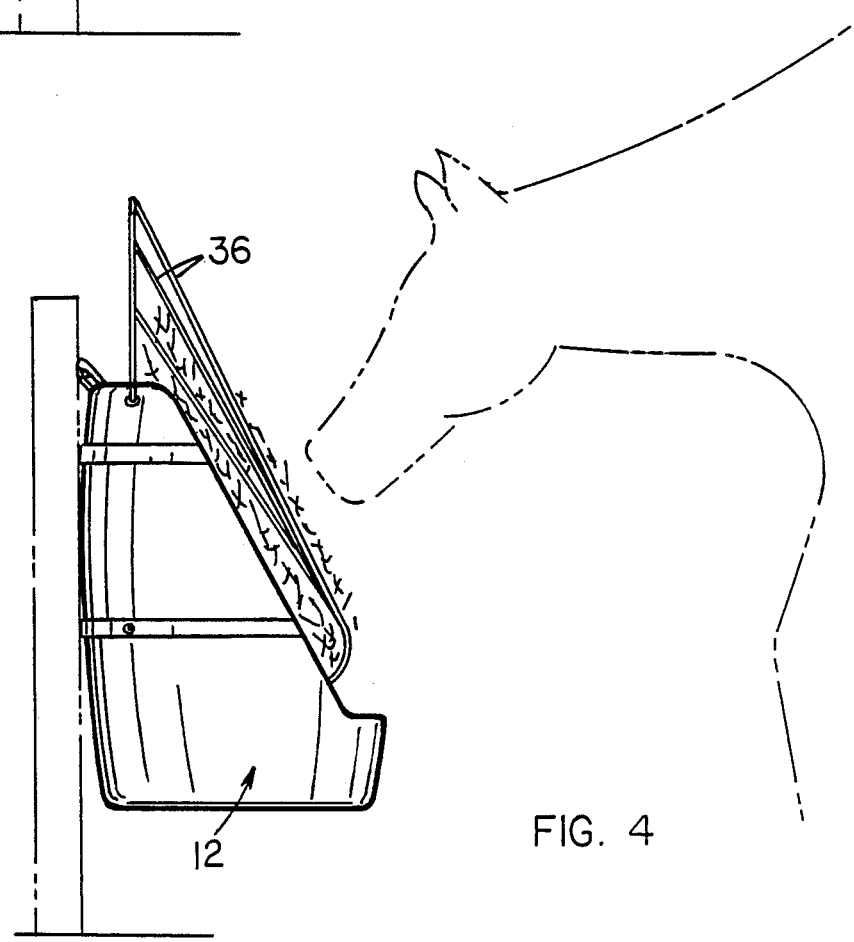
FIG. 4 is a side elevational view showing the feeder mounted on a fence in use; and, FIG. 5 is a side elevational view showing a feeder of the prior art in use.

FIG. 4 shows the feeder of the present invention in use. By way of contrast, FIG. 5 shows a typical prior art feeder in use. Note that the prior art feeder is mounted higher above the ground or floor than is the feeder of the present invention. This is because the prior art feeder is loaded from the top, and if it were mounted lower, the horse would eat from the top rather than from the front. As can be seen in FIG. 4, in the present invention, the hay is inserted from the rear of the feeder through the upstanding arch 32.

It is especially noteworthy that the bars 36 of the present invention slope downwardly and forwardly, while in contrast, the bars 4 of the prior art feeder slope downwardly and rearwardly. When a horse feeds from the prior art feeder of FIG. 5, bits of hay fall into his eyes and ears annoying the horse. That is not possible with the feeder of the present invention because of the lower location of the feeder.

Thus, there has been described a horse feeder that g permits the horse to feed in a more natural position, and this aids the horse's salivation and digestion.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A feeder for horses and other grazing animals, comprising:
   a receptacle having a back portion and a front portion, the height of the back portion exceeding the height of the front portion, said receptacle being open at its top and front; and,
   a grille sloping downwardly and forwardly, spanning the open front of said receptacle, said grille having a top portion located above the top of the back portion of said receptacle so that a space exists between the top portion of said grille and the top of the back portion of said receptacle, whereby feed can be loaded into the feeder from the rear through the space.

2. A feeder for horses and other grazing animals, comprising:
   a receptacle having a back portion and a front portion, the height of the back portion exceeding the height of the front portion, said receptacle being open at its top and front; and,
   a grille sloping downwardly and forwardly, spanning the open front of said receptacle, said grille having a top portion located above the top of the back portion of said receptacle so that a space exists between the top portion of said grille and the top of the back portion of said receptacle, whereby feed can be loaded into the feeder from the rear through the space, the top portion of said grille having the shape of an upstanding arch.

3. A feeder for horses and other grazing animals, comprising:
   a receptacle consisting of portions of a barrel, having a back portion and a front portion, the height of the back portion exceeding the height of the front portion, said receptacle being open at its top and front; and,
   a grille sloping downwardly and forwardly, spanning the open front of said receptacle, said grille having a top portion located above the top of the back portion of said receptacle so that a space exists between the top portion of said grille and the top of the back portion of said receptacle, whereby feed can be loaded into the feeder from the rear through the space.

* * * * *